United States Patent Office 3,413,857
Patented Dec. 3, 1968

3,413,857
PRESSURE SENSOR
Stafford Malcolm Ellis, London, England, assignor to Elliott Brothers (London) Limited, London, England, a British company
Filed Oct. 11, 1966, Ser. No. 585,828
Claims priority, application Great Britain, Oct. 12, 1965, 43,338/65
5 Claims. (Cl. 73—407)

ABSTRACT OF THE DISCLOSURE

A transducer including two flexible diaphragms each supported at its periphery and disposed in mutually inclined planes, and also including a bridging member which is connected to a central part of each of the diaphragms. The bridging member is supported solely by its connection to the diaphragms for pivotal movement about an axis coincident with the line of intersection of the inclined planes. The bridging member is balanced about the axis by a balancing weight so that it will move pivotally to a position in which the forces applied to it by the diaphragms and any external force are in balance. There is a capacitive pick-off for sensing any pivotal displacement of the bridging member from a neutral position.

The invention relates to transducers, in particular, but not exclusively, for use as pressure transducers.

Background of the invention

Previously proposed transducers using relatively inclined diaphragms such as described in United States patent specifications Numbers 3,162,047 (Rosenberger) and 2,068,378 (Diehl) use a series of linkages for interconnecting the two diaphragms of which at least one linkage is rigidly connected to a frame.

In United States patent specification Number 3,162,047 (Rosenberger) the transducer has a non-linear characteristic i.e. the movement of the linkages is not directly proportional to the pressure difference applied across the diaphragms. To overcome this difficulty the transducer incorporates a rebalancing mechanism which tends to maintain the linkages in a neutral position and thereby eliminate the need to compensate the aforementioned non-linearity.

The transducer according to the present invention uses a system of linkages in which the entire linkages are supported by the diaphragms. The linkages are balanced about an effective pivotal axis by a balancing weight. Because the linkages are balanced about the pivotal axis the transducer has a substantially linear characteristic and therefore the need for a rebalancing mechanism is obviated.

The present invention provides a transducer comprising, in combination a housing, two flexible diaphragms disposed in said housing in mutually-inclined planes, means mounted in said housing and supporting each diaphragm at its periphery, a bridge member, couplings connecting said bridge member to a central part of each diaphragm for pivotal movement about an axis substantially coincident with the line of intersection of the said mutually-inclined planes in response to forces applied to it by the diaphragms, sensing means mounted in said housing and responsive to any pivotal displacement of the bridge member from a neutral position and biassing means acting on said bridge member about its axis of pivotal movement.

The present invention further provides a transducer comprising, in combination a housing, two flexible diaphragms disposed in said housing in mutually-inclined planes, means mounted in said housing and supporting each diaphragm at its periphery, a bridge member, having two mutually inclined arms and a leg, couplings connecting said mutually inclined arms to a central part of each diaphragm for pivotal movement about an axis substantially coincident with the line of intersection of the said mutually-inclined planes in response to forces applied to it by the diaphragms, sensing means mounted in said housing at a distance from the pivotal axis of the bridge member greater than the distance between each said coupling and said pivotal axis and being sensitive to the movment of said leg in response to any pivotal displacement of the bridge member from a neutral position.

The sensing means may be in the form of a capacitive or inductive electrical pick off arrangement.

The foregoing and further features of the invention will become apparent from the following description of a preferred embodiment thereof with reference to the accompanying drawing, in which.

Figure 1:
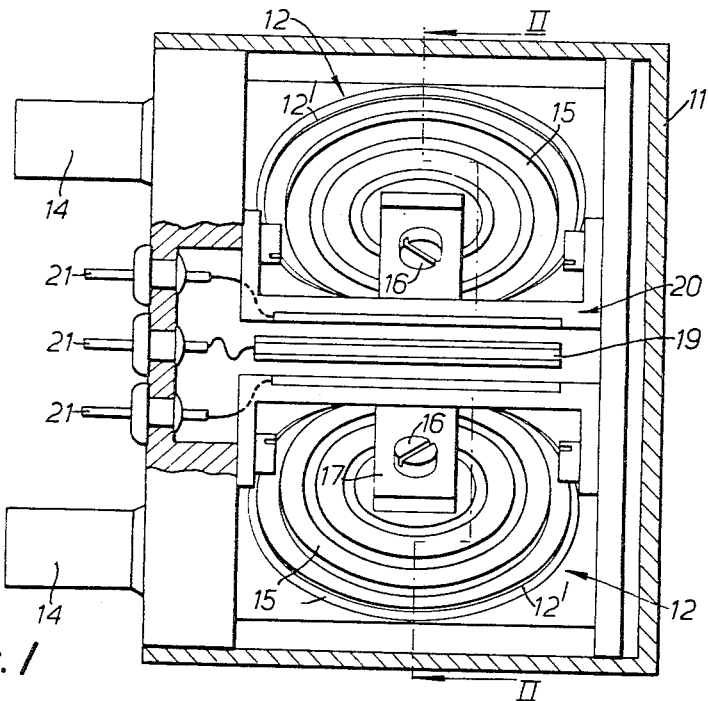
FIGURE 1 shows a side sectional view of a pressure transducer.

Referring now to the drawing there is shown a pressure transducer comprising a cylindrical housing 11 containing two pressure-responsive actuators 12. Each of the actuators 12 comprises a rigid cup 12' the mouth of which is closed in a fluid-tight manner by a respective flexible diaphragm 15, so that the diaphragm is rigidly supported around its periphery. Each of the cups 12' has an inlet port 13 (FIGURE 2) connected to respective pressure inlet connections 14 (FIGURE 1) provided externally of the housing 11.

Each of the diaphragms 15 is rigidly connected by a respective screw 16 to a respective arm of a Y-shaped bridge member 17, the bridge member being supported only by is connection to the diaphragms.

The actuators 12 are so positioned in the housing 11 that the diaphragms 15 lie in planes inclined to one another, and in the illustrated embodiment normal to one another, the arms of the Y-shaped member 17 being likewise inclined to one another, and accordingly movement of the Y-shaped member 17 caused by movement of the diaphragms 15 is a pivotal movement about an axis 17a through member 17.

A coupling member 19 carried by the Y-shaped member 17 extends between the arms of the Y-shaped member 17 in line with the leg thereof and co-operates with a sensing device 20, which can be for example a capacitive or inductive electrical pick off arrangement, for sensing or measuring the pivotal movement of the coupling member 19 away from a neutral position. Terminals 21 are provided on the housing 11 and are connected respectively to portions of the sensing device 20 and member 19 for providing electrical connections thereto and therefrom.

A knurled wheel balance weight 18 having an internally threaded aperture is carried by the leg of the Y-shaped member 17 so that rotation of the wheel 18 causes it to move along the leg of the member 17 to balance the Y-shaped member about the pivot axis 17a.

Figure 2:
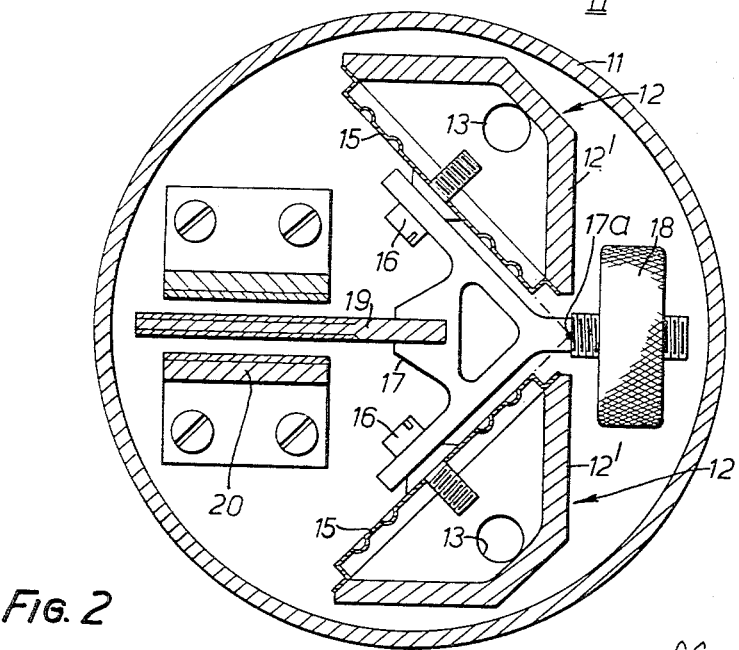
FIGURE 2 shows a sectional view along the line II—II of the pressure transducer of FIGURE 1.

Alternatively, the coupling member 19 could extend on the opposite side of the Y-shaped member to that shown in FIGURE 2 being supported by, or forming part of, the leg of the member. In this event, the balance weight would be reduced in size or possibly dispensed with if the coupling member were made of suitable weight and dimensions.

In operation two sources of fluid under pressure, the relative pressures of which are required to be determined, are connected to the pressure inlet connections 14 to feed the fluid under pressure to the actuators 12. The diaphragms 15 move to positions depending on the difference in the pressures of the fluid contained in the respective cups 12′ and the Y-shaped member is pivotally moved about its point 17a. In turn, movement of the member 19 within the sensing device 20 produces an output signal representative of the difference in the pressures of the fluids contained within the cups 12′.

Alternatively one of the cups 12′ can be evacuated, the output from the sensing device 20 then being representative of the absolute value of the pressure of the fluid contained within the other cup 12′.

The illustrated embodiment is particularly sensitive in that for relatively small movements of the diaphragms 15, a substantially magnified movement of the member 19 is produced, this being due to the angled positions of the diaphragms 15 providing a pivotal movement of the member 17 and member 19. In addition the transducer is not sensitive to the ambient pressure present within the housing.

Although the illustrated embodiment is a pressure transducer, it should be realised that the invention is not limited to such transducers. For example the two diaphragms 15 whose relative positions are to be determined could be under the control of electromagnetic or bimetal devices, in place of the pressure chambers formed by the cups 12′.

Further the illustrated embodiment could be utilized as an accelerometer, since the bridging member will move pivotally to a position in which the forces applied to it by the diaphragms and any external force are in balance. Thus, by adjusting the balance wheel 18 so that the Y-shaped member is out of balance, the device is then sensitive to accelerations having a component in a direction normal to the longitudinal axis of member 19 in the plane of the device as shown in FIGURE 2.

I claim:
1. A transducer comprising, in combination,
a housing,
two flexible diaphragms disposed in said housing in mutually-inclined planes,
means mounted in said housing and supporting each diaphragm at its periphery,
a bridge member,
couplings connecting said bridge member to a central part of each diaphragm, for pivotal movement of said bridge member, about an axis substantially coincident with the line of intersection of the said mutually-inclined planes in response to forces applied to it by the diaphragms,
sensing means mounted in said housing and responsive to any pivotal displacement of the bridge member from a neutral position and biassing means acting on said bridge mmeber about its axis of pivotal movement.

2. A transducer according to claim 1 wherein said biassing means is a balancing weight,
the diaphragms on the one hand and said biassing means on the other hand acting on the bridge member on opposite sides of said axis of pivotal movement.

3. A transducer according to claim 1 wherein
said diaphragms apply predetermined forces to said bridge member, and
said biassing means is a weight responsive to acceleration or deceleration of the transducer to effect movement of the bridge member.

4. A transducer according to claim 1 wherein said sensing means comprise a capacitative pick-off device.

5. A transducer comprising in combination,
a housing,
two flexible diaphragms disposed in said housing in mutually-inclined planes,
means mounted in said housing and supporting each diaphragm at its periphery,
a bridge member having two mutually inclined arms and a leg,
the said arms and leg being integral with one another,
couplings connecting said mutually inclined arms to a central part of each diaphragm for pivotal movement of said bridge member about an axis substantially coincident with the line of intersection of the said mutually-inclined planes in response to forces applied to it by the diaphragms, and
sensing means mounted in said housing at a distance from the pivotal axis of the bridge member greater than the distance between each said coupling and said pivotal axis and being sensitive to the movement of said leg in response to any pivotal displacement of the bridge member from a neutral position.

References Cited
UNITED STATES PATENTS 2,068,378  1/1937  Diehl _____ 73—262
3,162,047  12/1964  Rosenberger _____ 73—407

S. CLEMENT SWISHER, *Acting Primary Examiner.*

DENIS E. CORR, *Assistant Examiner.*